Patented Nov. 15, 1938

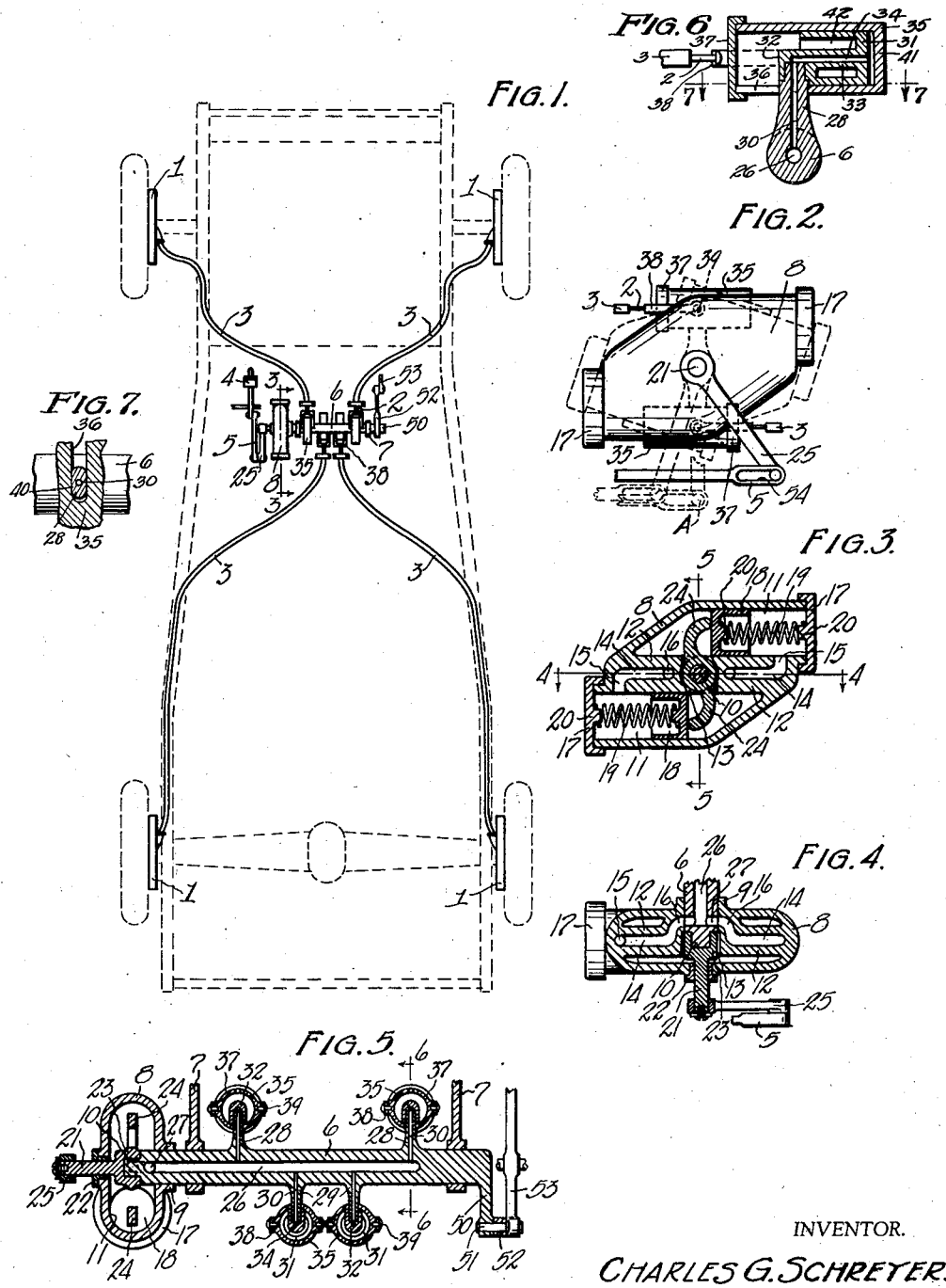

2,136,398

UNITED STATES PATENT OFFICE 2,136,398

HYDRO-MECHANICAL BRAKE OPERATING DEVICE

Charles G. Schreyer, South Bend, Ind., assignor of one-fourth to James H. Fulton, South Bend, Ind.

Application August 29, 1935, Serial No. 38,485

15 Claims. (Cl. 188—152)

This invention relates to a hydro-mechanical brake operating device, and has for its primary object to provide means normally operable to hydraulically actuate the mechanical brakes of an automotive vehicle and having a mechanical connection with the brakes which may be brought into operation in the event of partial or complete failure of the hydraulic system by merely actuating the brake pedal in a movement beyond the normal hydraulic-operating range of movement of said pedal.

A further object is to provide a device of this character in which the hydraulic system is entirely confined within a strong compact structural unit which is readily removable.

A further object is to provide a device of this character in which hydraulically operated means are associated with a rock shaft actuable to mechanically energize the brakes.

A further object is to provide a device of this character in which hydraulic means associated with a rock shaft is normally actuated by a predetermined partial movement of the brake pedal to actuate the brakes without movement of the rock shaft, and in which movement of the pedal beyond said predetermined partial movement rotates said shaft to insure complete and operative brake application. A further object is to provide novel means for initially creating fluid pressure and thereafter rocking the pressure creating and associated parts.

A further object is to provide a novel construction of rock shaft and hydraulic brake applying means by which mechanical brake application may be obtained in event of failure of the hydraulic system.

Other objects will be apparent from the description and the appended claims.

In the drawing:

Figure 1 is a plan view of my brake operating device applied to the chassis of an automotive vehicle.

Figure 2 is an end view of the device.

Figure 3 is a vertical transverse sectional view of the device taken on line 3—3 of Fig. 1.

Figure 4 is a horizontal longitudinal fragmentary sectional view taken on line 4—4 of Fig. 3.

Figure 5 is a longitudinal vertical sectional view taken on line 5—5 of Fig. 3.

Figure 6 is a vertical transverse sectional view taken on line 6—6 of Figure 5.

Figure 7 is a fragmentary horizontal sectional view taken on line 7—7 of Figure 6.

Referring to the drawing, which illustrates the preferred embodiment of my invention, the numeral 1 designates the brakes of an automotive vehicle. These brakes may be of any desired conventional mechanically actuated construction and, as illustrated, are adapted to be energized by cables 2 sheathed in anchored flexible non-expansible and non-contractible conduits 3, of conventional construction and application. A brake pedal 4 actuates a link 5 to energize my brake operating device which is adapted to control and pull the cables 2.

A transverse horizontal shaft 6 is journaled in bearings carried by supporting brackets 7 suitably secured to the chassis of the vehicle. On one of its ends the shaft 6 carries a housing 8 which may be welded or otherwise fixedly secured thereto or integrally formed therewith, as by collar 9 thereof, the end of said shaft terminating in a reduced diameter end portion 10 within the housing 8. Housing 8 includes a pair of parallel cylinders 11 positioned in laterally and vertically spaced opposed relation with respect to the center of the housing and to the axis of the shaft 6. Longitudinally centrally of the housing 8 extends a wall 12 which is centrally off-set in the direction of shaft 6 to provide a central opening 13. Extending longitudinally and centrally of the wall 12 are passages 14, the outer end of each of which communicates by passage 15 with the outer end of the adjacent cylinder 11. Passages 14 are off-set at 16, as best illustrated in Fig. 4, at the central off-set portion of wall 12. A cap 17 is removably mounted in normally sealing relation at each end of the housing 8, and these caps form closures for the outer ends of cylinders 11. A piston 18 is slidable in each cylinder 11, and coil springs 19 are disposed in said cylinders to bear on caps 17 and pistons 18 at their opposite ends, said caps 17 and pistons 18 preferably being provided with integral central inwardly projecting lugs 20 for positioning the ends of said springs. A stub shaft 21 extends through a stuffing or sealing bearing 22 at the center of the outer wall of the housing 8 and in coaxial relation to shaft 6. At its inner end said shaft is provided with an integral bearing or sleeve 23 journaled on reduced end 10 of shaft 6, and from this sleeve extend opposed arms 24 of curved or goose neck shape, the free ends of said arms bearing on the inner faces of the pistons 18. An arm 25 is fixedly carried by the outer end of shaft 21 at its upper end, and preferably extends downwardly therefrom at an angle to the vertical for pivotal connection with the free end of link 5.

The shaft 6 is provided with a central longitudinal passage or bore 26 terminating at one end in spaced relation to the end of the shaft, and communicating with opposed transverse passages 27 spaced from the reduced end portion 10 of the shaft, said passages 27 registering with the off-set end portions 16 of passages 14 of housing 8. Integrally formed with shaft 6 at spaced points thereof are perpendicularly projecting arms, there preferably being two upwardly extending arms 28 and two downwardly extending arms 29. Each of these arms has a bore 30 extending longitudinally centrally therethrough and into communication with passage 26, said bores 30 being of a diameter smaller than the diameter of passage 26. The arms 28, 29 are preferably of elongated cross sectional shape, as illustrated in Fig. 7, the major cross sectional axis thereof extending perpendicularly to the axis of shaft 6. The outer ends of the arms 28, 29 are of reduced dimension and circular shape, and are preferably threaded. A piston 31 is provided with an integral interior boss 32 adjacent its rear end and a central integral longitudinal stem 33. Boss 32 is provided with a threaded bore extending transversely thereof in which the reduced threaded end of the cooperating arm 28, 29 is secured to provide a strong structural connection between the piston and the shaft 6. A central longitudinal bore 34 is formed in the stem 33 of the piston, said bore 34 communicating at one end with passage 30 of the adjacent transverse arm of the rock shaft and opening at the face of the piston. An open ended cylinder 35 is slidably mounted on the piston and is provided with a longitudinal slot 36 extending in spaced relation from said open end whereby said cylinder may be mounted on said piston after the latter has been secured to one of the arms 28, 29 of shaft 6. A cap 37 is secured to the open end of the cylinder after the assembly of the parts. A clevis 38 whose arms are pivoted to cylinder 35 at 39 at points normally aligned with the upper end of the adjacent shaft arm 28 or 29 serves to connect each cable 2 with a cylinder 35. The slots 36 of cylinders 35 are preferably of a width whereby the flat side faces 40 of the shaft arms 28, 29 have guiding engagement with the edges thereof. As shown, the clevises 38 of the cylinders for the pistons mounted on shaft arms 28 are connected with the cables operating the front brakes, and the other two clevises are connected with the cables operating the rear brakes.

The cylinders 11, passages 14, 15 and 16 of housing 8, passages 26, 27 and 30 of shaft 6, bores 34 of pistons 31, and cylinders 35 form a complete and operative liquid system, and the same is filled with some suitable liquid, such as oil. In the normal or inoperative position of the device, the master pistons 18 in cylinders 11 are disposed at their innermost position, and the pistons 31 are disposed at their outermost position in closely spaced relation to the end walls 41 of cylinders 35, as illustrated in Figs. 3 and 6, respectively.

In the operation of the device, depression of brake pedal 4 actuates link 5 and arm 25 to rock shaft 21 and thereby shift arms 24 in the direction of the outer ends of master cylinders 11 to slide pistons 18 outwardly and oppositely against the action of springs 19. The liquid pressure thus created is transmitted through passages 15, 14, 16, 27, 26, 30 and 34 to act against the end walls 41 of the secondary cylinders 35 to shift said secondary cylinders relative to shaft 6 guided by the long skirts 42 of pistons 31 and the arms 28, 29 in guide slots 36. The cables 2 are thus pulled and transmit the operating force to the brakes 1. The parts are so proportioned, as by substantial equality of the total cross sectional area of master cylinders 11 with the total cross sectional area of secondary cylinders 35, that fluid pressure created by the initial pedal movement acts in opposed relation and equally on cylinders 35 and 11, respectively, to normally effect a balance of pressures which avoids rotation of shaft 6 and its associated parts. In this connection, it will also be understood that the device must be adjusted according to the tension of the brake springs in order to effect initial hydraulic brake operation while shaft 6 remains stationary. The pull applied to each cable is equal, as in all liquid pressure actuated systems, i. e., each brake is actuated to exert a braking action on the vehicle equal to that exerted by every other brake regardless of variations in the degree of adjustment of the brake shoes of the individual brakes. Thus in normal operation the device affords hydraulically equalized application of strictly mechanical brakes and thus eliminates long liquid conduits extending to the individual brakes and other objectionable features of strictly hydraulic brakes.

The brake pedal 4 is so arranged relative to my device that a predetermined partial depression or movement thereof will serve to shift arms 24 to the full extent of their piston actuating movement, and further shifting of said arms 24 effects engagement thereof with the walls of opening 13 in the portion 12 of housing 8, in which opening the bearing 23 mounting arms 24 is positioned. By this arrangement, full actuation of the hydraulic system is obtained by said predetermined partial pedal movement which shifts link 5 and arm 25 to the dotted line position A in Fig. 2. Movement of brake pedal 4 beyond said predetermined partial movement through engagement of arms 24 with portion 12 of housing 8 rocks or rotates said housing 8 and also shaft 6 to which it is secured. This further pedal movement, in the event a partially operable liquid pressure is contained in the system, maintains or continues exertion of said pressure by virtue of the fact that the master pistons 18 are held in extended or liquid-pressure-creating position by the arms 24 during such further pedal movement. In other words, if the pressure-induced movement of cylinders 35 relative to their pistons 31 upon initial movement of the pedal is insufficient to apply an effective full brake applying movement to the cables 2, a further movement of the brake pedal shifts the housing 8, shaft 6, pistons 31 and cylinders 35 in brake applying direction to mechanically insure full brake application. Likewise, if the hydraulic system should entirely fail due to loss of liquid therefrom to an extent sufficient to render impossible the creation of any brake operating liquid pressure, the initial stage of movement of the pedal will merely serve to take up lost motion and will then act mechanically to apply the brakes. In the latter event, the movement of the pedal actuated parts to position A, Fig. 2, will be lost motion, and continued pedal application will rock housing 8, shaft 6 and pistons 31 to first shift said pistons the small distance which normally constitutes necessary clearance between the piston faces and the end walls 42 of the cylinders 35 and then to carry the cylinders with the pistons to pull the cables 2. It will be noted that the provision of two master cylinders in opposed relation minimizes any tendency to rotate the shaft 6 before complete movement of pistons 18 which might be induced by the vertical component of the rotation of arms 24, so that the tension of the conventional springs within the brakes 1 will be sufficient to prevent such rotation until arms 24 engage the wall 12 to positively effect such shaft rotation.

This device therefore possesses the advantages of both hydraulic and mechanical brake operating devices. With respect to the hydraulic devices, my device provides the same primary advantage of equal application of the brakes; and with respect to mechanical brakes, my device provides the same primary advantage of insurance against complete failure of all brakes by the independent mechanical connections with the individual brakes. Other advantages of this device are that the liquid system, being built around shaft 6, is so strongly built that possibility of liquid leakage is almost entirely eliminated; the compactness and construction of the device with relation to shaft 6 permits it to be entirely sprung by the vehicle springs inasmuch as no part of the liquid system extends to the brakes; the mechanical take-up arrangement or cooperative relation and sequence of operation maintains and utilizes any hydraulic pressure initially generated, so that the brake application will be equal in all cases except complete failure of the hydraulic system; the parts of the hydraulic system all also form parts of the supplemental mechanical brake applying system, thus minimizing operating parts and simplifying the construction; and the compact construction of the device localizes and minimizes points at which trouble may occur and thus simplifies servicing and permits ready removal and replacement of the device as a unit.

This device is also well adapted for the application of an emergency brake lever thereto, whereby to actuate all the vehicle brakes independently of pedal 4. In this application the shaft 6 may be provided with an integral laterally projecting arm 50 to which may be pivoted, by pin 51, an end of link 52 which is pivoted at its opposite end to lever 53. The link 52 may be provided with an elongated slot similar to slot 54 of link 5 to permit independent actuation of the device by either pedal 4 or lever 53. The lever 53 acts to rock shaft 6, arms 28 and 29, and pistons 31 to take up the normal clearance between said pistons and the walls 41 of secondary cylinders 35 to bodily shift said cylinders and thereby pull on cables 2 to apply the brakes.

I claim:

1. The combination with a vehicle having a plurality of brakes and a brake pedal, of a pedal actuated brake actuating device comprising a rock shaft having a liquid passage, a housing fixed on said shaft and including a master cylinder communicating with said passage, a piston in said cylinder, piston actuating means operable by said pedal, a plurality of arms projecting from said shaft, a piston fixedly mounted on each arm, said arms and last named pistons having communicating passages communicating with said shaft passage, a secondary cylinder slidably mounted on each of said last named pistons, and a plurality of connectors each extending between a brake and a secondary cylinder, said pedal being actuable a predetermined partial movement to fully energize said first named piston and thereby actuate said secondary cylinder to normally effect brake application, and being actuable beyond said predetermined partial movement to rock said device in brake applying direction as a unit, by engagement of said piston actuating means with said master cylinder.

2. The combination with a vehicle having a brake and a brake pedal, of a pedal actuated brake actuating device comprising a rockable shaft having a liquid passage, a housing fixed on said shaft and including a master cylinder communicating with said passage, a master piston in said cylinder, piston actuating means operable by said pedal, a secondary piston fixed on said shaft and having a passage therethrough communicating with said shaft passage, a secondary cylinder slidably mounted on said secondary piston, and a connector between said brake and secondary cylinder, said pedal being actuable a predetermined partial movement to fully energize said master piston for actuating said secondary cylinder to normally actuate said brake and being actuable therebeyond to rock said device in brake-applying direction as a unit by engagement of said piston actuating means with said master cylinder.

3. The combination with a vehicle having a brake and a brake pedal, of a pedal actuated brake actuating device comprising a rockable shaft having a liquid passage, a master cylinder fixed on said shaft and communicating with said passage, a primary piston in said cylinder, piston actuating means operable by said pedal, a secondary piston fixedly mounted on said shaft and having a passage therethrough communicating with said shaft passage, a secondary cylinder slidably mounted in said secondary piston, and a connector extending between said brake and secondary cylinder, said pedal being actuable a predetermined partial movement to fully energize said primary piston for normal hydraulic brake-applying actuation of said secondary cylinder and being actuable therebeyond to interengage said piston actuating means and master cylinder and thereby rock said device as a unit for mechanical application of said brake.

4. The combination with a vehicle having a brake pedal and a mechanically actuated brake, of a pedal actuated brake actuating device comprising a rock shaft, a master cylinder fixed on said shaft, said shaft having a liquid passage communicating with said cylinder, a primary piston in said cylinder, a piston operator actuated by said pedal and a secondary cylinder and piston unit having one part thereof fixed on said shaft and communicating with said passage and the other part connected to said brake, said pedal being actuable a predetermined partial movement to fully energize said primary piston for normal hydraulic brake-applying actuation of said secondary unit and being actuable therebeyond to interengage said operator and master cylinder to rock said master cylinder, shaft and secondary cylinder and piston unit in brake applying direction.

5. A hydro-mechanical brake operating device comprising a normally stationary rockable shaft having a liquid passage, a housing fixed on said shaft and including a master cylinder having a passage communicating with said shaft passage, a piston in said cylinder, means pivoted on said shaft for actuating said piston to initially create a hydraulic brake-applying pressure, actuation of said means beyond a predetermined partial pivotal movement effecting engagement with said cylinder to rock said housing and shaft therewith.

6. A hydro-mechanical brake operating device comprising a rockable member having a liquid passage, a housing fixed to said member and including a cylinder, a wall in said housing having an off-set portion and a passage extending therethrough and between said cylinder and said first named passage, a piston in said cylinder, and rotatable piston energizing means positioned in said off-set whereby rotation of said means beyond a predetermined piston-energizing movement effects engagement thereof with said wall to rotate said housing and rockable member.

7. A hydro-mechanical brake operating device comprising a rock shaft having a liquid passage, a housing fixed to one end of said shaft and including a cylinder communicating with said passage, a piston in said cylinder, and piston actuating means journaled on said shaft, said last named means being rotatable a predetermined partial movement to energize said piston and thereafter engaging said cylinder to rotate said housing and shaft therewith.

8. A hydro-mechanical brake operating device comprising a normally stationary rockable shaft having a liquid passage, a housing fixed on said shaft and including an internal structure providing a cylinder and a passage extending between said cylinder and first named passage, a piston in said cylinder, and means for actuating said piston to initially create a hydraulic brake-applying pressure, actuation of said means beyond a predetermined movement effecting engagement thereof with said internal structure to rock said housing and shaft.

9. A hydro-mechanical brake operating device comprising a rockable shaft having a liquid passage, a housing fixed on said shaft and including a cylinder spaced from said shaft, a piston in said cylinder, a lever journaled on said shaft and including an arm normally extending angularly to the axis of said cylinder and engaging said piston, said arm engaging said cylinder after a predetermined movement of said lever to rock said housing and shaft upon further lever movement.

10. A hydro-mechanical brake operating device comprising an operating member, a normally stationary rock shaft having a liquid passage, means actuable by said operating member to first produce a liquid pressure in said passage and thereafter rock said shaft, an arm integral with said shaft having a passage communicating with said shaft passage, a piston fixed on said arm and having a passage communicating with said arm passage at one end and open at its other end, and a cylinder encompassing said piston and having a longitudinal slot adjacent one end thereof through which said arm extends, said cylinder being slidable on said piston guided by said slot and arm upon transmission of liquid pressure through said passages thereto and thereafter bodily shifted by rocking of said shaft.

11. A hydro-mechanical brake operating device comprising a normally stationary rockable shaft having a liquid passage, an arm projecting from said shaft, said arm having a passage communicating with said shaft passage, a piston fixedly mounted on said arm and having a long skirt and a passage open at one end and communicating with said arm passage at its other end, a cylinder receiving said piston at one end and having a longitudinal slot in its other end, said arm having opposed flat side faces bearing on the edges of said slot, the piston skirt and bearing engagement of said arm faces and slot edges serving to guide sliding of said cylinder on said piston upon application of liquid pressure from said passages thereto.

12. A hydro-mechanical brake operating device comprising a normally stationary member having a liquid passage, means carried by said member adapted upon a predetermined partial movement thereof to create a liquid pressure in said passage, and a brake connected member carried by said first member and normally energized by liquid pressure in said passage, a part of said pressure creating means engaging said first member upon actuation beyond said predetermined partial movement to shift said first member and brake connected member in brake applying direction said first member, pressure creating means and brake connected member constituting a unitary assembly.

13. The combination with a vehicle having brakes and a pedal, of a normally stationary member having a liquid passage, pedal actuated means operable by a predetermined partial movement to create a pressure in said passage, and brake connected members carried by said first member and communicating with said passage for normal brake-applying actuation by liquid pressure in said passage, a part of said pedal actuated means engaging said first member upon actuation beyond said predetermined partial movement to shift said first named member and said brake connected members in brake applying direction said first member, pedal actuated means and brake connected members being assembled as a structural unit.

14. The combination with a vehicle having brakes, a brake pedal, and a brake lever, of hydro-mechanical brake operating means including means energized by initial partial movement of said pedal for creating fluid pressure, and brake connected means normally energized by said pressure to apply said brakes, said pedal actuated means including parts interengaging upon predetermined movement of said means to bodily shift said brake connected means in brake applying direction upon actuation of said pedal beyond said normal brake operating partial movement, said lever being associated with said brake connected means and one of said parts to bodily shift the same to apply the brakes independently of said pedal.

15. The combination with a vehicle having a brake pedal and a brake including a spring opposing application thereof, of a rockable shaft, means carried by said shaft and connected with said brake, a housing fixed on said shaft having an internal structure including a pair of cylinders whose axes extend perpendicularly to said shaft, said cylinders being spaced apart and positioned on opposite sides of said shaft, a piston in each cylinder, and means journaled on said shaft for actuating said pistons, said shaft and brake connected means having liquid passages communicating with said cylinders to permit normal hydraulic actuation of said pistons, said brake spring opposing rocking of said shaft during actuation of said pistons, said piston actuating means engaging said internal structure after a predetermined movement thereof to rock said shaft and brake connected means in brake applying direction.

CHARLES G. SCHREYER.